UNITED STATES PATENT OFFICE.

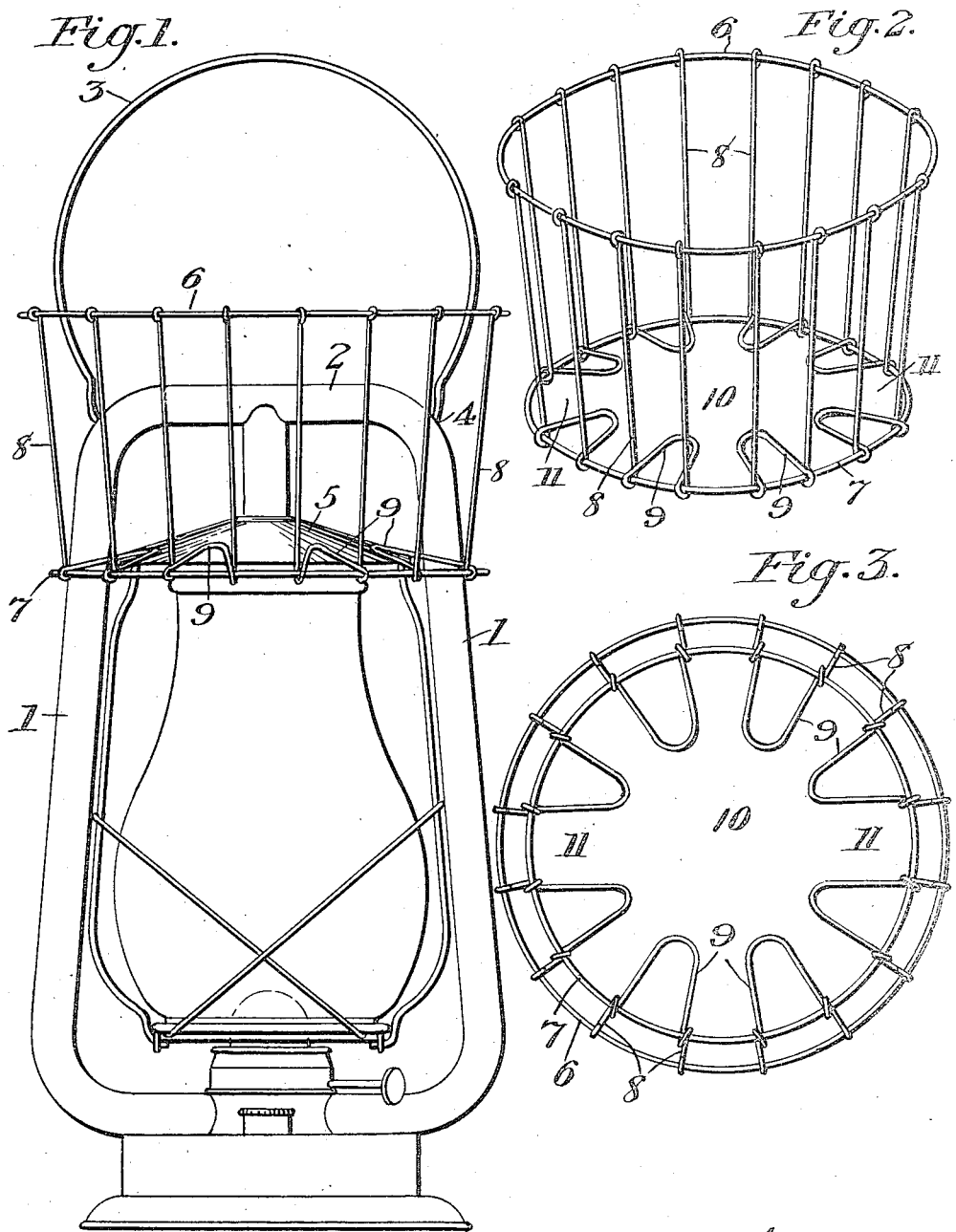

DAVID M. KUPIHEA, OF HONOLULU, TERRITORY OF HAWAII.

MEANS FOR WARMING OR KEEPING WARM LIQUIDS AND FOOD STUFFS.

1,259,527.

Specification of Letters Patent.

Patented Mar. 19, 1918.

Application filed March 26, 1917. Serial No. 157,539.

*To all whom it may concern:*

Be it known that I, DAVID M. KUPIHEA, a citizen of the United States, and a resident of Honolulu, county of Honolulu, and Territory of Hawaii, have invented new and useful Improvements in Means for Warming or Keeping Warm Liquids and Food Stuffs; and I do hereby declare the following to be a full, clear, and exact description of the same.

The invention relates to a device which is applicable to the usual form of lantern and which may be used for the warming of liquids or food stuffs.

The primary object of the invention resides in the provision of a simple device which may be applied to the ordinary type of lantern without in any way modifying the construction of the lantern, and which will act as a basket for containing the materials to be warmed.

With this and other objects in view, such as will appear as my description progresses, my invention comprises the combination and arrangement of parts as set forth in and falling within the scope of the appended claims.

In the drawing—

Figure 1 is a side elevation of a device constructed in accordance with my invention, the same being shown in place on a lantern.

Fig. 2 is a perspective view of the device; and

Fig. 3 is a top plan view.

In the drawings I have illustrated the usual form of lantern which includes a pair of side bars 1, and a top bar 2, which is formed integral with the side bars, and also includes a handle 3, which is pivoted at 4 to the side bars. The top 5 of the lantern, is attached to the side bars 1 in the usual manner, and is of the usual form.

My invention, as illustrated in the drawings, takes the form of a wire receptacle, which includes an upper circular element 6 and a lower similarly shaped element 7, which latter is, however, preferably of less diameter than the former. Extending between these elements 6 and 7, and secured to each of the same so as to hold them properly spaced, is a plurality of rods 8, which hold the elements in properly spaced relation and form with said elements, a receptacle. The top of this receptacle is entirely open, while the bottom thereof is partly closed by inwardly projecting fingers 9, which are preferably formed of wire bent into U-form, which wire may or may not be integral with the side rods 8. These fingers 9 extend radially, but terminate short of the center of the circular element 7, so that an opening 10 is formed, which opening is adapted to receive the top 5 of the lantern. At diametrically opposite points the fingers 9 are separated to a considerable extent so that spaces 11 result, which spaces are provided for the purpose which will later appear.

When the device is applied to a lantern, it is merely placed upon the upper end of the same so that the top 5 will extend into the opening 10, and the fingers 9 will rest upon the top. The side bars 1 of the lantern will extend upwardly through the spaces 11, so that the fingers on the opposite side of the side bars 1 of the lantern will prevent the rotative movement of the device.

It should be obvious that when the device is supported in this manner upon the upper end of the lantern, that it will be positively held in place, and will be in a position to receive liquids or foodstuffs to be heated. Furthermore, it is to be remembered that the device may be placed on the upper end of the lantern without in any way modifying the lantern itself.

While I have illustrated the device as constructed of wire or rods, it is, of course, obvious that it may be constructed of various other material, so long as it retains the same general form.

What I claim is:—

1. The combination with the usual form of lantern, which includes a top, side bars and a top bar, of a receptacle detachably mounted on the upper end thereof having means engaging the side bars to prevent its rotation with relation to the lantern, and supporting means engaging the top of the lantern.

2. In a device of the character described, the combination with upper and lower elements, of means extending between and secured to the same to form a receptacle, the top of the receptacle being open, and means extending inwardly from the lower element but terminating short of the center of the same for supporting the receptacle on the lantern.

3. In a device of the character described, the combination with upper and lower elements, of means extending between and secured to the same to form a receptacle, the top of the receptacle being open, fingers extending inwardly from the lower element to engage the top of a lantern to support the receptacle, certain of said fingers being spaced apart to permit the passage of the side bars of the lantern between the same.

DAVID M. KUPIHEA.

Witnesses:
H. G. SPENCER,
TENYATE PUNG.

Copies of this patent may be obtained for five cents each, by addressing the "Commissioner of Patents, Washington, D. C."